D6-500 AU 293 EX
NOD25 XR RE 5,212

D F. RANDALL.

Design for Bands for Car Seats.

No. 5,212. Reissued Dec. 31, 1872.

Witnesses:

Gustave Dieterich

S. M. Prout

Susan Randall
Thomas A. Randall
Admr's. of D. F. Randall dec'd per

Attorneys.

UNITED STATES PATENT OFFICE.

SUSAN RANDALL, OF CHICOPEE, MASSACHUSETTS, AND THOMAS A. RANDALL, OF PROVIDENCE, RHODE ISLAND, ADMINISTRATORS OF D. F. RANDALL, DECEASED.

DESIGN FOR BANDS FOR CAR-SEATS.

Specification forming part of Design No. 2,693, dated July 2, 1867; reissue No. 5,212, dated December 31, 1872.

*To all whom it may concern:*

Figure 1:
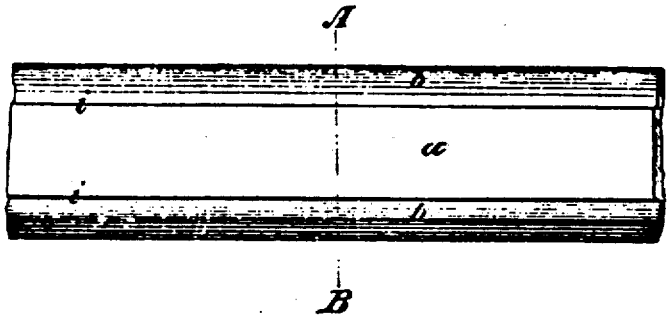
Figure 2:
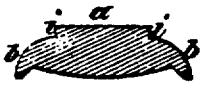

Be it known that I, D. F. RANDALL, of Chicopee, in the county of Hampden and State of Massachusetts, have invented a new and original Design for a Metallic Band for Railroad-Car Seats, of which the following is a specification:

Figure 1 is a plan view of the band. Fig. 2 is a vertical transverse section through the line A B of Fig. 1.

The band is made plane or flat on the surface, shown at *a*, having the rectangular shoulders *i i* extending down a short distance to the convex surfaces *b b*, this convexity being formed by the arc of a circle, and extending from the shoulders *i i* to the lower edges of the band.

This metallic band is designed to be used as a trimming to the back of a railway-car seat by being secured around its edges as a finish, and may be made of block tin or any other suitable material.

Having thus described the invention, what we claim, and desire to secure by Letters Patent, is—

The design for a metallic band for railway-car seats, herein described and shown.

SUSAN RANDALL, *Administratrix.*
T. A. RANDALL, *Administrator.*

Witnesses to signature of SUSAN RANDALL:
GEO. D. ROBINSON,
H. L. SHERMAN.

Witnesses to signature of T. A. RANDALL:
JAMES G. MARKLAND,
J. FRANK BRENNAN.